United States Patent
Klotz

Patent Number: 5,992,037
Date of Patent: Nov. 30, 1999

[54] OIL LEVEL INDICATOR FOR AN ENGINE WITH AN INTEGRAL SPRING FOR ESTABLISHMENT OF A CALIBRATION POSITION

[75] Inventor: James R. Klotz, Mt. Clemens, Mich.

[73] Assignee: Chrysler Corporation, Auburn Hills, Mich.

[21] Appl. No.: 08/874,532

[22] Filed: Jun. 13, 1997

[51] Int. Cl.[6] .................................................. G01F 23/04
[52] U.S. Cl. ........................... 33/722; 33/726; 33/723; 123/196 R
[58] Field of Search .................. 33/700, 722, 723, 33/726, 728, 729, 730, 731; 123/196 R, 196 S

[56] References Cited

U.S. PATENT DOCUMENTS

| | | | |
|---|---|---|---|
| Re. 26,422 | 7/1968 | Stade et al. | 33/731 |
| 1,658,774 | 2/1928 | Taub . | |
| 2,539,604 | 11/1951 | Woolley | 33/722 |
| 2,660,058 | 3/1953 | Vogt | 33/722 |
| 2,675,620 | 2/1954 | Whitcomb | 33/723 |
| 2,756,716 | 9/1956 | Petrossian | 33/722 |
| 2,757,647 | 8/1956 | Kishline . | |
| 3,054,188 | 9/1962 | Cupido et al. | 33/723 |
| 3,098,914 | 7/1963 | Gianninno | 33/722 |
| 3,311,984 | 4/1967 | Stux et al. | 33/729 |
| 3,372,418 | 3/1968 | Moeller | 33/729 |
| 4,055,898 | 11/1977 | Braun et al. . | |
| 4,330,940 | 5/1982 | Leitgeb . | |
| 4,403,418 | 9/1983 | Vagias | 33/700 |
| 4,480,610 | 11/1984 | Stinson | 123/196 S |
| 4,640,126 | 2/1987 | Jansch . | |
| 4,683,851 | 8/1987 | Henneberry | 123/196 S |
| 5,094,008 | 3/1992 | Murphy et al. | 33/723 |

*Primary Examiner*—Diego Gutierrez
*Assistant Examiner*—Mario Fernandez
*Attorney, Agent, or Firm*—Kenneth H. Maclean

[57] ABSTRACT

An oil level indicator assembly for a vehicle engine including an elongated indicator member removably housed in a tubular sleeve which has spaced upper end and lower end portions with an interior passage therebetween and an internal shoulder-like formation therein. The elongated indicator member has a coil spring formation adapted to engage the shoulder-like formation when the indicator and sleeve are in an assembled relationship, thereby establishing a predetermined length of the indicator to project into the engine oil. The effect of oil on indicia formed on the indicator member when withdrawn from the sleeve member shows the level of oil in the engine.

8 Claims, 2 Drawing Sheets

OIL LEVEL INDICATOR FOR AN ENGINE WITH AN INTEGRAL SPRING FOR ESTABLISHMENT OF A CALIBRATION POSITION

BACKGROUND

1. Field of the Invention

The present invention relates generally to an oil level indicator assembly for an engine and more particularly for an oil level indicator device which includes an axially yieldable portion to accommodate changes in the length of the indicator and to establish a calibration position with respect to a support housing and to the oil level.

2. Description of the Related Art

Vehicle engines typically utilize oil level indicators or "dip sticks" for checking the level of oil in the sump portion or oil pan of the engine. Normally, this dip stick is inserted into a tube and the effects of gravity are relied upon to maintain its rest position in the tube. It is desirable to utilize the housing tube both for supporting the dip stick and for an inlet passage for introducing oil into the engine. When the tubular housing is increased in diameter to allow it to be used for oil introduction, it is necessary to provide a combination cap or cover and dip stick handle. Thus, the cover or cap becomes fixed to the tubular housing. The U.S. Pat. No. 1,658,774 to Taub discloses a combination level indicator, oil introduction housing, and cap/handle arrangement, as does U.S. Pat. No. 4,640,126 to Jansch. Other relevant U.S. patents include: U.S. Pat. No. 2,756,716 to Petrossian; U.S. Pat. No. 2,757,647 to Kishline; U.S. Pat. No. 4,055,898 to Braun et al.; U.S. Pat. No. 4,330,940 to Leitgeb; and U.S. Pat. No. 4,941,268 to Tausk.

SUMMARY OF THE INVENTION

The present invention provides an enlarged level indicator housing or sleeve so that oil can be introduced into the oil sump portion of the engine. The elongated level indicator has an upper combination cover or cap for the sleeve and handle for the indicator member. The lower portion of the sleeve and the indicator have cooperative structural features to establish a calibration support for the indicator with respect to the sleeve. This calibration support is close to the oil level in the engine so as to provide a relatively short lower portion of the indicator member between the calibration support and the oil level so that any effects of growth or shrinkage of the indicator member caused by temperature changes is minimized.

More specifically in a preferred embodiment, the elongated indicator member has a yieldable portion integrally formed therein which establishes the aforedescribed described calibration support along with a shoulder-like structure formed within the sleeve's interior passage. The yieldable portion is preferably in the form of a compressible coil spring having an end surface formed by the lowest coil which surface abuts the shoulder-like portion. This forms a generally circular ring located in a plane normal to the axis of the indicator member.

Other objects, features and advantages of the present invention will become apparent by reference to the following detailed description when considered in conjunction with the accompanying drawings.

DESCRIPTION OF THE PREFERRED EMBODIMENT

Figure 1:
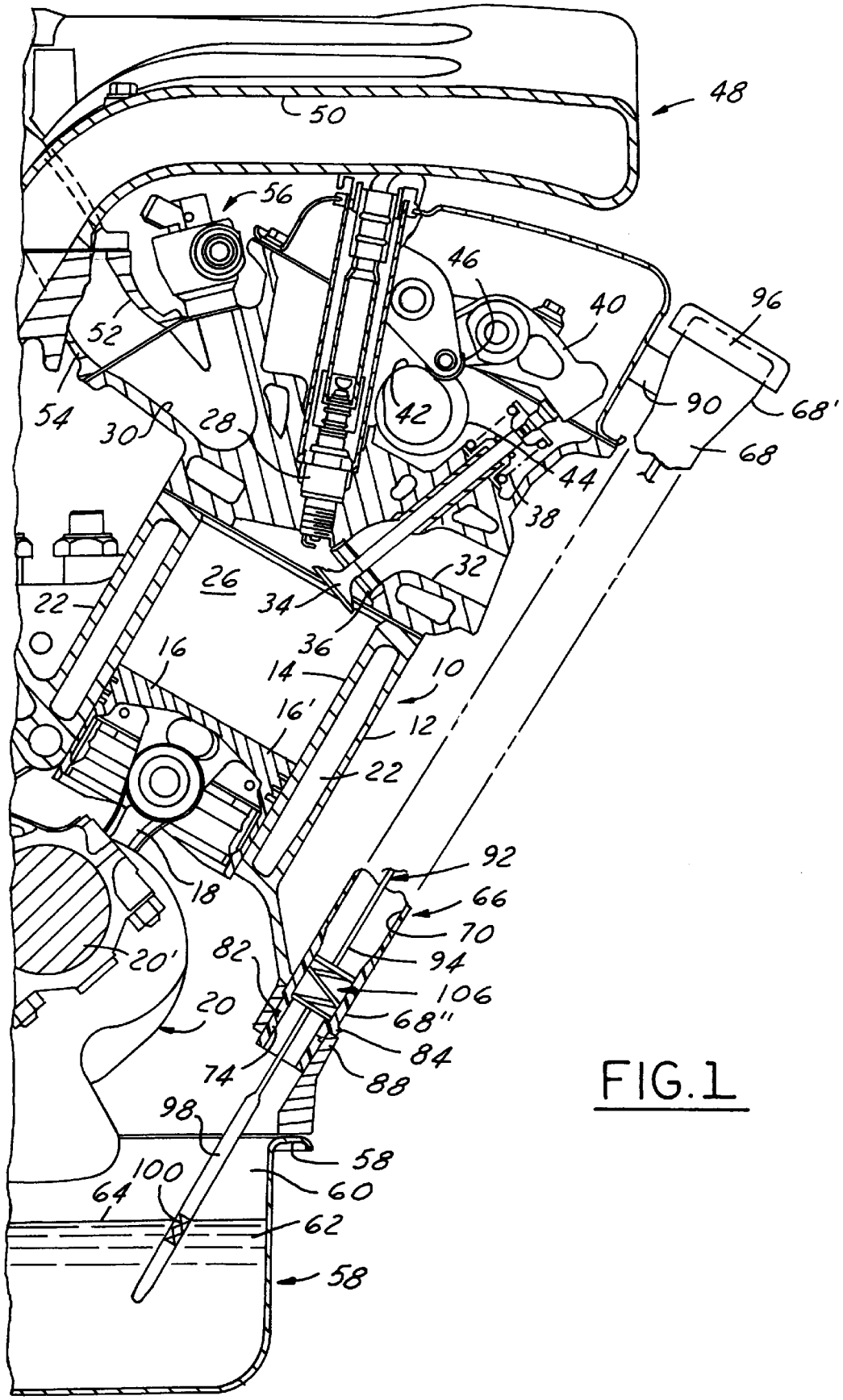
FIG. 1 is a partial sectioned elevational view of an engine showing the subject level indicator.

In FIG. 1, a cross-sectioned elevational end view of an internal combustion engine 10 is shown. Engine 10 is composed of an engine block 12 having cylinder bores 14 formed therein (only one shown). A piston 16 is shown reciprocally mounted in bore 14. Piston 16 is pivotally connected to an upper end of a connecting rod 18 whose lower end portion is attached to a journal 20' of a crankshaft 20. The block 12 is cooled by coolant flow through passages 22 formed in the block.

A cylinder head assembly 24 overlies and is attached to the upper end of the block 12. The cylinder head assembly 24 overlies each of the cylinder bores 14 and with surface 16' of a piston 16 a combustion chamber 26 is formed. A spark plug 28 is associated with each combustion chamber to cause a mixture of air and fuel to burn in the combustion chamber 26 when the plug is energized. Air and fuel enter the combustion chamber 26 through an intake passage 30 in the cylinder head and the flow is regulated by opening and closing of an intake valve (not visible in FIG. 1). After burning and expanding in the combustion chamber 26, the gases formed from the air and fuel passes from the combustion chamber 26 through an exhaust passage 32. Flow into the exhaust passage 32 is regulated by opening and closing of an exhaust valve 34 (shown in an opened position). The exhaust valve 34 seats against a valve seat 36 when in its closed operative position. As is true with the intake valve, the exhaust valve 34 is moved from a closed position to its opened position (shown) against the force of a closing spring 38 by the action of a clockwise pivoting actuator or rocker arm 40. The rocker arm 40 is pivoted in response to the passing engagement of a lobe portion 42 on a rotating camshaft 44. A roller 46 carried by the end of the rocker arm reduces friction between it and the lobe 42.

Other known engine components in FIG. 1 include an intake manifold 48, passages 50 in manifold 48, and intermediate passages 52 in an air distributing connecting member 54. Also, an electrically actuated fuel injector 56 is shown.

The bottom portion of the block 12 must be open during engine assembly to facilitate the mounting of pistons 16 in bores 14 and the installation of the crankshaft 20. Once these components are assembled into the block, the bottom portion is enclosed by an oil pan member 58 which is attached to the block by a plurality of fasteners (not shown) along its edges 58'. The oil pan 58 is utilized to define an oil storage sump or enclosure 60 into which a desired quantity of lubricating and cooling oil 62 is contained. The desired quantity of oil defines a liquid surface 64 in the sump 60. During engine operation, the level of oil in the sump decreases due to pumping of the oil to bearings, etc. However, a minimum level of oil is always desirable in the sump 60 so that the inlet of the oil pump (not shown) is always able to take in oil.

Figure 2:
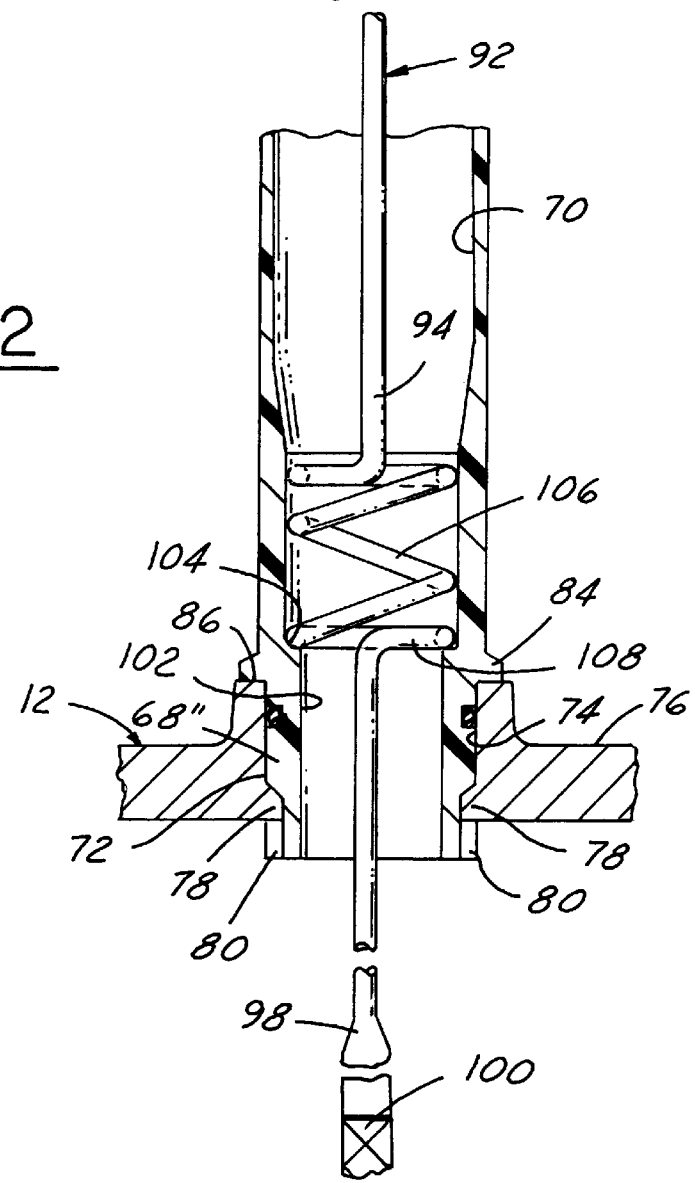
FIG. 2 is an enlarged view of the oil level indicator in its mounted operational position with respect to the engine.

As seen in FIG. 1 but even better shown in FIG. 2, an oil level indicating assembly 66 is utilized for allowing a vehicle owner or service mechanic to check the level (quantity) of oil in the engine and more exactly, the level in the sump of an inoperative engine. The oil level indicating assembly 66 includes an elongated, tubular sleeve member 68 defining an interior passage 70. The sleeve member 68 has an open upper end portion 68' and a lower end portion 68". The lower end portion 68" has a reduced outer diameter portion 72 for insertive mounting in an aperture 74 formed in a wall portion 76 of the block 12. The aperture 74 has radially inwardly directed splines or tabs 78 which are received by correspondingly formed grooves 80 in the lower end portion 68" of the sleeve. Interaction of the tabs 78 with the grooves 80 prevents rotation of the sleeve in the aperture 74. An O-ring seal 82 between the end portion 68" and the wall portion 76 inhibits oil leakage therebetween. Finally, insertion of the sleeve 66 into aperture 74 is limited by engagement between a radially outwardly directed lip 84 and the surface 86 of a boss 88. The whole sleeve assembly is secured relative to the engine by attachment of a flange portion 90 to an upper portion of the engine which also prevents upward movement of the sleeve out of aperture 74. In addition, the grooves 80 may include circumferentially extending portions to permit a limited partial rotation of the sleeve 68 in the aperture once it is fully inserted. This would establish the sleeve in a locked condition both in the rotative sense and also in an axial manner to prevent outward movement of the sleeve from the aperture 74 of the engine block 12.

The oil level indicator itself is an elongated, cylindrical member 92 which has a slender and somewhat flexible mid portion 94. The upper end portion 92' of the member 92 is attached to a radially extending cap member 96. The cap portion is adapted to attach to or be secured with respect to the upper end portion of the sleeve to fix the member 92 at an axial position with respect to the sleeve member 68 when in a usual storage position during which the engine is operated and the oil level is not being checked. The indicator member 92 has a lower end portion 98 which extends from the lower end portion 68" and wall portion 76 into the sump enclosure 60 and into the quantity of oil 62 therein, especially when the engine is inoperative as seen in FIG. 1. At the desired liquid level 64 for the oil in the sump 60, the surface of the indicator is scribed or otherwise marked to form indicators or indicia 100. In a preferred embodiment, this indicia 100 is in the form of scribed or raised lines to indicate a desired or maximum level, an "add oil" level, and cross-like formations or roughness therebetween. This allows an observer to readily observe where the upper surface 64 of the oil has contacted the indicator member 92.

It can be seen that the relative axial position of the indicator member 92 with respect to the supporting sleeve member is very important for accurate reading of the oil level 64 in the sump enclosure 60. It can be understood that inaccuracies in the axial positioning of member 92 with respect to sleeve 68 also effects accuracy. Significantly, temperature changes of the indicator member 92 are a source of inaccuracy. Since indicator member 92 is elongated, it is subject to substantial axial growth with changes in temperature. The subject indicator provides an improved accuracy in level detection by providing a solid support for the lower portion of the indicator member 92. This support is located very near the oil level 64 to minimize the length of the indicator which can change with temperature variations.

Specifically, the lower end portion of the sleeve member 68 has a reduced diameter bore 102 which forms a continuation of the larger diameter interior passage 70. The reduction of the interior diameter forms a shoulder-like formation or circular edge 104.

The indicator member 68 has a helically shaped coil spring portion 106 integrally formed adjacent the shoulder-like formation 104. Specifically, the coil spring portion 106 has a portion 108 which forms a substantially circular ring positioned in a plane normal to the axis of the indicator member 92. Accordingly, when the indicator member 92 is inserted into the sleeve 68 and cap portion 96 is secured to the sleeve, this circular ring seats against the shoulder-like formation 104 and yielding of the spring accommodates any axial variation of the member 92. More importantly, the seating of ring 108 against seat 104 establishes a desirable centering of the indicator's lower portion 98 and also accurately positions the indicator member 92 with respect to the desired liquid level 64. Thus, any growth or decrease in the length of the relatively short lower portion 98 with temperature changes does not result in any significant inaccuracies.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A vehicle engine having a liquid containing sump enclosure for storing a desired quantity of liquid and a liquid level indicator interactive with the quantity of liquid for indicating the liquid level within the sump enclosure which is indicative of a desirable volume of liquid needed by the engine, comprising:

a generally tubular sleeve member defining an interior passage and having a lower end portion supported through an upper portion of the engine's sump enclosure and an open upper end portion thereby defining an elongated inlet extending from the open upper end portion, through the interior passage, and into the sump portion;

a shoulder forming means in said interior passage of said sleeve at its lower end portion;

an elongated liquid level indicator member extendable through said interior passage and into the liquid sump enclosure of the engine, said indicator member having an enlarged upper portion for interacting with said upper end portion of said sleeve member to secure said indicator member axially with respect to said sleeve, said indicator member also having an axially yieldable portion adjacent said shoulder forming means and interactive therewith to regulate the length of said indicator member extending through said sleeve member between said open upper end portion and said shoulder forming portion, whereby the remainder of said indicator member extends a predetermined set distance from said shoulder forming means into said liquid sump enclosure.

2. The engine and liquid level indicator set forth in claim 1 wherein said yieldable portion of said elongated level indicator member is in the form of an integral coil spring portion of the level indicator.

3. The engine and liquid level indicator set forth in claim 1 wherein said shoulder forming means takes the form of a reduced diameter bore through said lower end portion of said sleeve member which bore leads from the interior passage, through said sleeve's lower end portion and into the engine's liquid sump enclosure.

4. The engine and liquid level indicator set forth in claim 3 wherein said coil spring portion includes a generally circular ring portion in a plane normal to the axis of said indicator member for providing a substantially continuous seating between said ring portion and said shoulder forming means.

5. For an internal combustion vehicle engine having an oil sump enclosure for storing a quantity of oil used for lubrication and cooling purposes and with an aperture into the sump enclosure, an elongated oil level indicator interactive with the quantity of oil in the sump enclosure for indicating the oil level therein which is indicative of a desirable volume of oil needed by the engine, said level indicator having an automatic length adjusting feature, comprising:

- a generally tubular sleeve member for housing the oil level indicator when in a stored operative position, said sleeve defining an interior passage extending therethrough from an open upper end portion to a lower end portion where said sleeve is adapted to be attached to the engine so that said sleeve's interior passage is aligned with the aperture into the engine's sump enclosure;

- shoulder forming means defined in said interior passage of said sleeve adjacent said lower end portion;

- an elongated oil level indicator member extendable through said sleeve'interior passage and into the engine's oil sump enclosure, said indicator member having an enlarged upper portion interactive with said upper end portion of said sleeve member to axially secure said indicator member in said sleeve's interior passage, said indicator member also having an axially yieldable mid-portion located adjacent said shoulder forming means and interactive therewith to automatically regulate the length of said indicator member extending through said sleeve member between said open upper end portion and said shoulder forming portion thereby allowing a remaining length of said indicator member to extend a predetermined set distance from said engagement with said shoulder forming means and into the oil stored within said oil sump enclosure.

6. The oil level indicator assembly for an engine as set forth in claim 5 wherein said yieldable portion of said elongated level indicator member is in the form of an integral coil spring portion.

7. The oil level indicator assembly for an engine as set forth in claim 5 wherein said shoulder forming means takes the form of a reduced diameter bore through the lower end portion of said sleeve member which bore leads extends from the interior passage, through said sleeve's lower end portion and into the engine's oil sump enclosure.

8. The engine and oil level indicator set forth in claim 7 wherein said coil spring portion includes a generally circular ring portion in a plane normal to the axis of said indicator member for providing a substantially continuous seating between said ring portion and said shoulder forming means.

* * * * *